United States Patent
Wang

(10) Patent No.: US 12,113,748 B2
(45) Date of Patent: Oct. 8, 2024

(54) METHOD FOR DETECTING DOWNLINK CONTROL CHANNEL, METHOD FOR TRANSMITTING DOWNLINK CONTROL CHANNEL, AND RELEVANT DEVICES

(71) Applicant: DATANG MOBILE COMMUNICATIONS EQUIPMENT CO., LTD., Beijing (CN)

(72) Inventor: Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 344 days.

(21) Appl. No.: 17/619,058

(22) PCT Filed: Jul. 14, 2020

(86) PCT No.: PCT/CN2020/101846
§ 371 (c)(1),
(2) Date: Dec. 14, 2021

(87) PCT Pub. No.: WO2021/008517
PCT Pub. Date: Jan. 21, 2021

(65) Prior Publication Data
US 2022/0360418 A1   Nov. 10, 2022

(30) Foreign Application Priority Data

Jul. 18, 2019 (CN) .......................... 201910651951.8

(51) Int. Cl.
*H04W 4/00* (2018.01)
*H04L 5/00* (2006.01)
*H04W 24/08* (2009.01)

(52) U.S. Cl.
CPC ........... *H04L 5/0094* (2013.01); *H04W 24/08* (2013.01)

(58) Field of Classification Search
CPC ..... H04L 5/0094; H04L 5/005; H04L 5/0053; H04W 24/08; H04W 24/02; H04W 56/00
See application file for complete search history.

(56) References Cited

U.S. PATENT DOCUMENTS

| 10,893,431 B2* | 1/2021 | Liou ...................... H04W 16/28 |
| 10,952,231 B2* | 3/2021 | Liou ................... H04W 72/046 |

(Continued)

FOREIGN PATENT DOCUMENTS

| CN | 110011714 A | 7/2019 | |
| CN | 110446259 A * | 11/2019 | ........... H04L 5/0053 |

(Continued)

OTHER PUBLICATIONS

Extended European Search Report for European Patent Application 20841325.2, issued by the European Patent Office on Jul. 25, 2022.

(Continued)

*Primary Examiner* — Thai D Hoang
(74) *Attorney, Agent, or Firm* — Ladas & Parry, LLP

(57) ABSTRACT

The present disclosure related to the field of communication technology, and provides a method for detecting a downlink control channel, a method for transmitting a downlink control channel, and relevant devices. The method performed by a UE includes detecting the downlink control channel within a current slot using a corresponding PDCCH resource pattern in accordance with whether there is an SSB within the current slot.

20 Claims, 3 Drawing Sheets

(56) References Cited

U.S. PATENT DOCUMENTS

| | | |
|---|---|---|
| 2019/0082427 A1 | 3/2019 | Kim et al. |
| 2019/0200307 A1* | 6/2019 | Si .................. H04W 72/0453 |
| 2020/0374847 A1* | 11/2020 | Liu .................. H04L 5/0053 |
| 2021/0068085 A1 | 3/2021 | Chen |
| 2021/0219199 A1* | 7/2021 | Zhang .............. H04W 36/0005 |

FOREIGN PATENT DOCUMENTS

| | | | | |
|---|---|---|---|---|
| CN | 115316031 A | * | 11/2022 | ......... H04B 7/15528 |
| EP | 3771128 A1 | * | 1/2021 | .............. H04B 7/06 |
| EP | 3934302 A1 | * | 1/2022 | ............. H04L 5/005 |
| EP | 4037230 A1 | * | 8/2022 | .......... H04J 11/0069 |
| EP | 4037231 A1 | * | 8/2022 | .......... H04J 11/0073 |
| EP | 4184969 A1 | * | 5/2023 | ........... H04L 5/0053 |
| WO | WO-2018171924 A1 | * | 9/2018 | .......... H04J 11/0073 |
| WO | 2018226054 A1 | | 12/2018 | |
| WO | WO-2019018778 A1 | * | 1/2019 | .......... H04J 11/0023 |
| WO | WO-2019068957 A1 | * | 4/2019 | ........... H04B 7/0617 |
| WO | WO-2021038264 A1 | * | 3/2021 | ............ H04W 48/08 |
| WO | WO-2021188276 A1 | * | 9/2021 | ........... H04B 7/0695 |
| WO | WO-2021231816 A1 | * | 11/2021 | ............... H04L 1/08 |

OTHER PUBLICATIONS

"Remaining details of RMSI," 3GPP TSG RAN WG1 Meeting AH 1801, R1-1800080, Vancouver, Canada, Jan. 22-26, 2018, Source: ZTE, Sanechips, Agenda: 7.1.2.2, all pages.

"Summary of open issues related to rate-matching in NR," 3GPP TSG-RAN WG1 #92bis, R1-1805518, Sanya, China, Apr. 16-20, 2018, all pages.

International Search Report for PCT Application PCT/CN2020/101846 issued on Oct. 9, 2020, and its English Translation provided by WIPO.

Written Opinion for PCT Application PCT/CN2020/101846 issued on Oct. 9, 2020, and its English Translation provided by WIPO.

International Preliminary Report on Patentability for PCT Application PCT/CN2020/101846 issued on Jan. 18, 2022, and its English Translation provided by WIPO.

"On Remaining Issues on RMSI," 3GPP TSG RAN WG1 Meeting AH 1801, R1-1800229, Vancouver, Canada, Jan. 22-26, 2018, Source: CATT, Agenda Item: 7.1.2.2.

* cited by examiner detecting a downlink control channel within a current slot using a corresponding PDCCH resource pattern in accordance with whether there is an SSB within the current slot — 101 transmitting a downlink control channel within a current slot using a corresponding PDCCH resource pattern in accordance with whether there is an SSB within the current slot ⟵ 401

METHOD FOR DETECTING DOWNLINK CONTROL CHANNEL, METHOD FOR TRANSMITTING DOWNLINK CONTROL CHANNEL, AND RELEVANT DEVICES

CROSS-REFERENCE TO RELATED APPLICATIONS

The present application is the U.S. national phase of PCT Application No. PCT/CN2020/101846 filed on Jul. 14, 2020, which claims a priority to the Chinese patent application No. 201910651951.8 filed on Jul. 18, 2019, the disclosures of which are incorporated herein by reference in their entireties.

TECHNICAL FIELD

The present disclosure relates to the field of communication technology, in particular to a method for detecting a downlink control channel, a method for transmitting a downlink control channel, and relevant devices.

BACKGROUND

In a satellite communication system, a Synchronization Signal Block (SSB) is transmitted periodically in a fixed pattern. Each SSB occupies 4 consecutive Orthogonal Frequency Division Multiplexing (OFDM) symbols in a time domain, and within a slot for transmitting the SSBs, a first SSB occupies the $4^{th}$ to $7^{th}$ OFDM symbols. Considering the requirement on a Peak-to-Average Power Ratio (PAPR), a downlink control channel and the SSB are multiplexed in a Time Division Multiplexing (TDM) manner on first N symbols within each slot. A first symbol within the slot is used to transmit a Common Reference Signal (CRS) rather than the other channel(s).

However, a Direct Fourier Transformer Spread Orthogonal Frequency Division Multiplexing (DFT-s-OFDM) waveform is used in the satellite communication system, and in order to ensure a single-carrier characteristic, it is impossible to transmit different channels on a time-domain symbol on a transmission bandwidth. When there is a collision between a Control Resource Set (CORESET) and a symbol for transmitting the SSB, all Physical Downlink Control Channels (PDCCHs) in the CORESET are incapable of being transmitted normally, resulting in a scheduling failure.

SUMMARY

An object of the present disclosure is to provide a method for detecting a downlink control channel, a method for transmitting a downlink control channel, and relevant devices, so as to solve the problem in the related art where the PDCCHs in the CORESET are incapable of being transmitted normally and thereby the scheduling failure occurs when there is a collision between the CORESET and the symbol for transmitting the SSB.

In one aspect, the present disclosure provides in some embodiments a method for detecting a downlink control channel performed by a User Equipment (UE), including detecting the downlink control channel within a current slot using a corresponding PDCCH resource pattern in accordance with whether there is an SSB within the current slot.

In some possible embodiments of the present disclosure, the detecting the downlink control channel within the current slot using the corresponding PDCCH resource pattern in accordance with whether there is the SSB within the current slot includes detecting the downlink control channel using a first PDCCH resource pattern within a slot where the SSB is transmitted. The first PDCCH resource pattern occupies consecutive N1 symbols in a time domain and B1 Resource Blocks (RBs) in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the detecting the downlink control channel within the current slot using the corresponding PDCCH resource pattern in accordance with whether there is the SSB within the current slot includes detecting the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

In another aspect, the present disclosure provides in some embodiments a method for transmitting a downlink control channel performed by a network device, including transmitting the downlink control channel within a current slot using a corresponding PDCCH resource pattern in accordance with whether there is an SSB within the current slot.

In some possible embodiments of the present disclosure, the transmitting the downlink control channel within the current slot using the corresponding PDCCH resource pattern in accordance with whether there is the SSB within the current slot includes transmitting the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the transmitting the downlink control channel within the current slot using the corresponding PDCCH resource pattern in accordance with whether there is the SSB within the current slot includes transmitting the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

In yet another aspect, the present disclosure provides in some embodiments a UE, including a transceiver, a memory, a processor, and a program stored in the memory and executed by the processor. The processor is configured to execute the program, so as to detect the downlink control channel within a current slot using a corresponding PDCCH resource pattern in accordance with whether there is an SSB within the current slot.

In some possible embodiments of the present disclosure, the processor is further configured to detect the downlink control channel using a first PDCCH resource pattern within a slot where the SSB is transmitted. The first PDCCH resource pattern occupies consecutive N1 symbols in a time domain and B1 Resource Blocks (RBs) in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the processor is further configured to detect the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

In still yet another aspect, the present disclosure provides in some embodiments a network device, including a transceiver, a memory, a processor, and a program stored in the memory and executed by the processor. The transceiver is configured to execute the programs, so as to transmit the downlink control channel within a current slot using a corresponding PDCCH resource pattern in accordance with whether there is an SSB within the current slot.

In some possible embodiments of the present disclosure, the transceiver is further configured to transmit the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the transceiver is further configured to transmit the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

In still yet another aspect, the present disclosure provides in some embodiments a device for detecting a downlink control channel for a UE, including a processing module configured to detect the downlink control channel within a current slot using a corresponding PDCCH resource pattern in accordance with whether there is an SSB within the current slot.

In still yet another aspect, the present disclosure provides in some embodiments a device for transmitting a downlink control channel for a network device, including a transmission module configured to transmit the downlink control channel within a current slot using a corresponding PDCCH resource pattern in accordance with whether there is an SSB within the current slot.

In still yet another aspect, the present disclosure provides in some embodiments a computer-readable storage medium storing therein a program. The program is executed by a processor so as to implement steps in the above-mentioned method for detecting the downlink control channel for the UE or steps in the above-mentioned method for transmitting the downlink control channel for the network device.

The present disclosure has the following beneficial effects.

According to the embodiments of the present disclosure, the downlink control channel is detected within the current slot using an appropriate PDCCH resource pattern in accordance with whether there is the SSB within the current slot. As a result, it is able to prevent a decrease in a downlink control channel capacity, thereby to prevent the occurrence of such a circumstance where it is impossible to transmit the downlink control channel within the slot where the SSB is transmitted.

DETAILED DESCRIPTION

In order to make the objects, the technical solutions and the advantages of the present disclosure more apparent, the present disclosure will be described hereinafter in a clear and complete manner in conjunction with the drawings and embodiments.

Figures 1, 2:
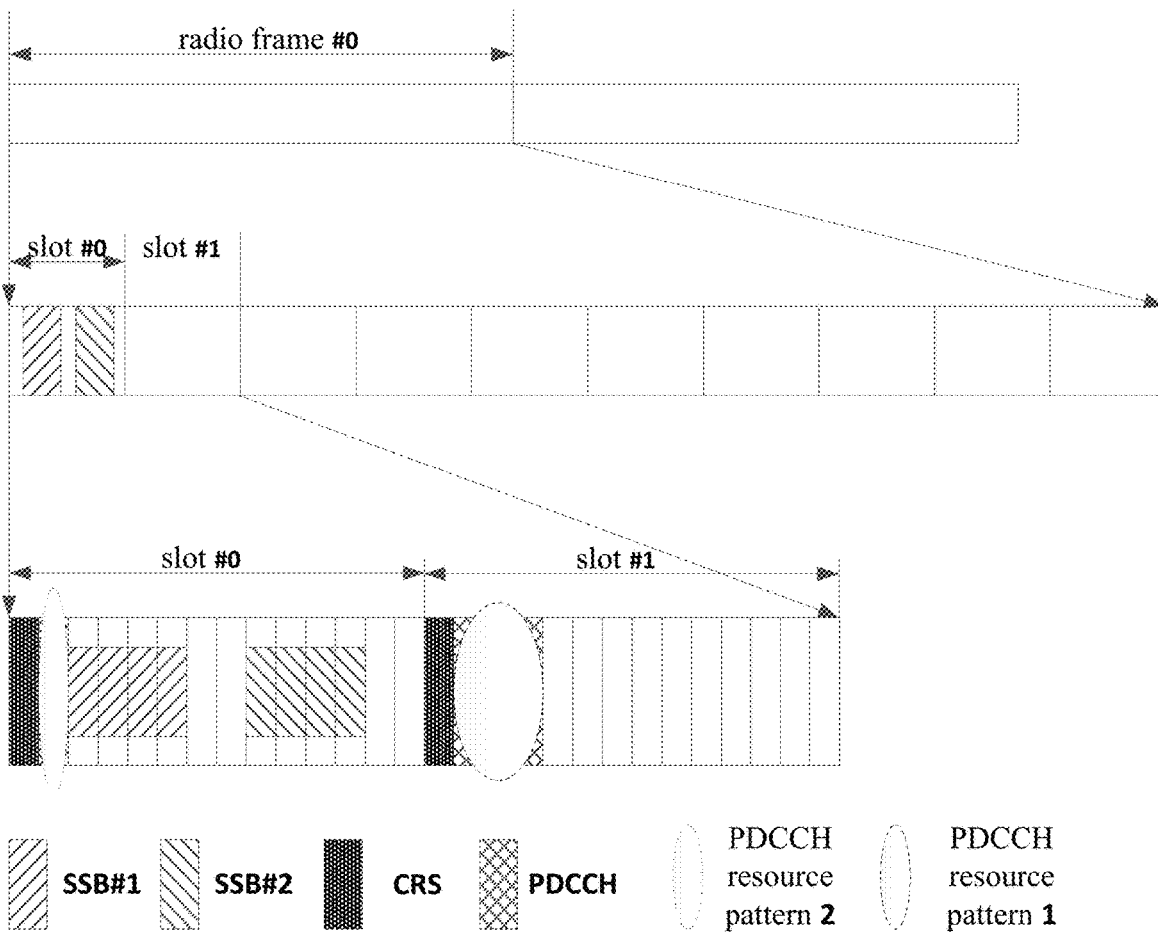
FIG. 1 is a flow chart of a method for detecting a downlink control channel according to one embodiment of the present disclosure.
FIG. 2 is a schematic view showing the application of the methods according to some embodiments of the present disclosure.

As shown in FIG. 1, the present disclosure provides in some embodiments a method for detecting a downlink control channel for a UE, which includes Step 101 of detecting the downlink control channel within a current slot using a corresponding PDCCH resource pattern in accordance with whether there is an SSB within the current slot.

According to the embodiments of the present disclosure, the downlink control channel is detected within the current slot using an appropriate PDCCH resource pattern in accordance with whether there is the SSB within the current slot. As a result, it is able to prevent a decrease in a downlink control channel capacity, thereby to prevent the occurrence of such a circumstance where it is impossible to transmit the downlink control channel within the slot where the SSB is transmitted.

Of course, the downlink control channel is transmitted by a corresponding network device within the current slot using the PDCCH resource pattern in accordance with whether there is the SSB within the current slot, so that the UE detects and receives the downlink control information.

In some possible embodiments of the present disclosure, Step 101 includes detecting the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

Here, the first PDCCH resource pattern is a PDCCH resource pattern suitable for detecting the downlink control channel within the slot where the SSB is transmitted. The first PDCCH resource pattern occupies consecutive N1 symbols in the time domain, and occupies B1 RBs in the frequency domain. In this regard, the UE detects and receives the downlink control channel using the first PDCCH resource pattern within the slot where there is the SSB.

Correspondingly, the network device transmits the downlink control channel using the first PDCCH resource pattern within the slot where the SSB is transmitted.

In the embodiments of the present disclosure, in order to ensure that a PDCCH transmission resource does not overlap the SSB in the time domain. In some possible embodiments of the present disclosure, the first PDCCH resource pattern is pre-defined in a protocol or determined in accordance with a resource position of the SSB.

Here, for the first PDCCH resource pattern predefined in a protocol or determined in accordance with the resource position of the SSB, the consecutive N1 symbols occupied in the time domain do not overlap the SSB in the time domain.

In addition, in the embodiments of the present disclosure, Step 101 further includes detecting the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

Here, the second PDCCH resource pattern is a PDCCH resource pattern suitable for detecting the downlink control channel within the slot where no SSB is transmitted. The second PDCCH resource pattern occupies consecutive N2 symbols in the time domain, and occupies B2 RBs in the frequency domain. In this regard, the UE detects and receives the downlink control channel using the second PDCCH resource pattern within the slot where there is no SSB.

Correspondingly, the network device transmits the downlink control channel using the second PDCCH resource pattern within the slot where no SSB is transmitted.

In some possible embodiments of the present disclosure, the second PDCCH resource pattern is configured by the network device through high layer signaling.

The application of the method in the embodiments of the present disclosure will be described hereinafter in conjunction with specific scenarios.

In a first scenario, the network device, e.g., a base station, needs to transmit two SSBs (SSB #1 and SSB #2) within a period of 20 ms, and the SSBs are transmitted within 5 ms. Within a slot (slot #0) where the SSBs are transmitted, SSB #1 occupies symbols {#2 #3 #4 #5}, and SSB #2 occupies symbols {#8 #9 #10 #11}. A downlink control channel transmission region configured by the base station for the UE is symbols {#1 #2 #3} within the slot, and it occupies an entire transmission bandwidth B3 in the frequency domain. The symbol #0 is used for transmitting a CRS. The downlink control channel transmission region is called as a PDCCH resource pattern 1. Meanwhile, a PDCCH resource pattern 2 is defined as occupying the symbol {#1} within the slot in the time domain and occupying the entire transmission bandwidth B3 in the frequency domain.

As shown in FIG. 2, within the slot (slot #1) where no SSB is transmitted, the base station transmits the downlink control channel using the PDCCH resource pattern 1, and the UE detects and receives the downlink control channel using the PDCCH resource pattern 1. Within the slot (slot #0) where the SSB is transmitted, the base station transmits the downlink control channel using the PDCCH resource pattern 2, and the UE detects and receives the downlink control channel using the PDCCH pattern 2. In other words, the base station and the UE adaptively and flexibly adjust a transmission region and a reception region for the downlink control channel in accordance with a transmission position of the SSB.

In this regard, the base station does not need to transmit the downlink control channel using a single PDCCH resource pattern, so it is able to prevent a decrease in a control channel capacity within the slot where the SSB is transmitted, and enable the UE to detect and receive the PDCCH within the slot where the SSB is transmitted.

In a second scenario, the network device, e.g., a base station, needs to transmit two SSBs (SSB #1 and SSB #2) within a period of 20 ms, and the SSBs are transmitted within 5 ms. Within a slot (slot #0) where the SSBs are transmitted, SSB #1 occupies symbols {#2 #3 #4 #5}, and SSB #2 occupies symbols {#8 #9 #10 #11}. A downlink control channel transmission region configured by the base station for the UE is symbols {#1 #2 #3} within the slot, and it occupies a bandwidth B4 in the frequency domain. The bandwidth B4 is determined implicitly in accordance with a size of a frequency domain of CORESET #0, e.g., it occupies a same number of RBs in the frequency domain as CORESET #0. The symbol #0 is used for transmitting a Cell Reference Signal (CRS). The downlink control channel transmission region is called as a PDCCH resource pattern 3. Meanwhile, a PDCCH resource pattern 4 is defined as occupying the symbol {#1} within the slot in the time domain and occupying an entire transmission bandwidth B5 in the frequency domain, where B5>B4.

Figures 3, 4:
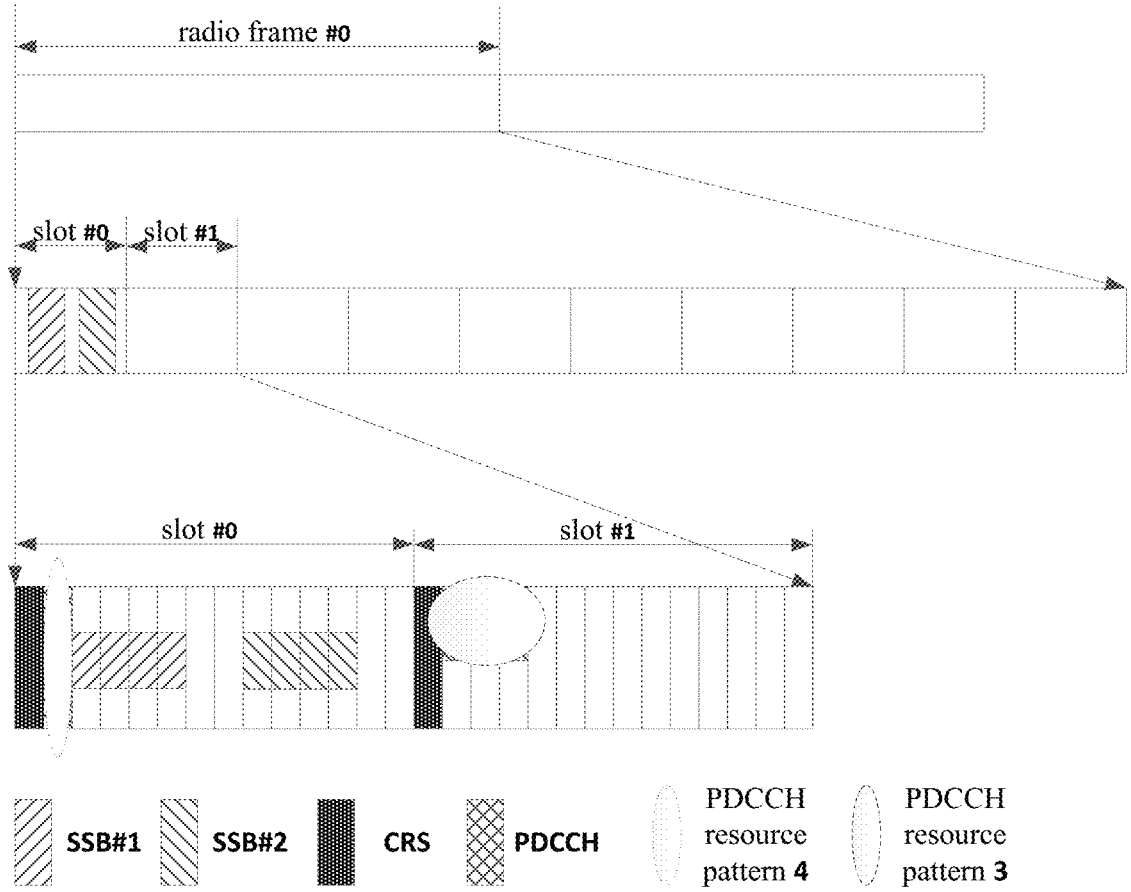
FIG. 3 is another schematic view showing the application of the methods according to some embodiments of the present disclosure.
FIG. 4 is a flow chart of a method for transmitting a downlink control channel according to one embodiment of the present disclosure.

As shown in FIG. 3, within the slot (slot #1) where no SSB is transmitted, the base station transmits the downlink control channel using the PDCCH resource pattern 4, and the UE detects and receives the downlink control channel using the PDCCH resource pattern 4. Within the slot (slot #0) where the SSB is transmitted, the base station transmits the downlink control channel using the PDCCH resource pattern 3, and the UE detects and receives the downlink control channel using the PDCCH pattern 3. In other words, the base station and the UE adaptively and flexibly adjust a transmission region and a reception region for the downlink control channel in accordance with a transmission position of the SSB.

In this regard, the base station does not need to transmit the downlink control channel using a single PDCCH resource pattern, so it is able to prevent a decrease in a control channel capacity within the slot where the SSB is transmitted, and enable the UE to detect and receive the PDCCH within the slot where the SSB is transmitted.

According to the method for detecting the downlink control channel in the embodiments of the present disclosure, the downlink control channel is detected within the current slot using an appropriate PDCCH resource pattern in accordance with whether there is the SSB within the current slot. As a result, it is able to prevent a decrease in the downlink control channel capacity, thereby to prevent the occurrence of such a circumstance where it is impossible to transmit the downlink control channel within the slot where the SSB is transmitted.

As shown in FIG. 4, the present disclosure provides in some embodiments a method for transmitting a downlink control channel for a network device, which includes Step 401 of transmitting the downlink control channel within a current slot using a corresponding PDCCH resource pattern in accordance with whether there is an SSB within the current slot.

Through this step, the network device transmits the downlink control channel within the current slot using an appropriate PDCCH resource pattern in accordance with whether there is the SSB within the current slot. As a result, it is able to prevent a decrease in a downlink control channel capacity, thereby to prevent the occurrence of such a circumstance where it is impossible to transmit the downlink control channel within the slot where the SSB is transmitted.

In some possible embodiments of the present disclosure, Step 401 includes transmitting the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

Here, the first PDCCH resource pattern is a PDCCH resource pattern suitable for detecting the downlink control channel within the slot where the SSB is transmitted. The first PDCCH resource pattern occupies consecutive N1 symbols in the time domain, and occupies B1 RBs in the frequency domain.

In some possible embodiments of the present disclosure, the first PDCCH resource pattern is pre-defined in a protocol or determined in accordance with a resource position of the SSB.

Here, for the first PDCCH resource pattern predefined in a protocol or determined in accordance with the resource position of the SSB, the consecutive N1 symbols occupied in the time domain do not overlap the SSB in the time domain.

In some possible embodiments of the present disclosure, Step 401 includes transmitting the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

Here, the second PDCCH resource pattern is a PDCCH resource pattern suitable for detecting the downlink control channel within the slot where no SSB is transmitted. The second PDCCH resource pattern occupies consecutive N2 symbols in the time domain, and occupies B2 RBs in the frequency domain. In this regard, the network device transmits the downlink control channel using the second PDCCH resource pattern within the slot where there is no SSB.

In some possible embodiments of the present disclosure, the second PDCCH resource pattern is configured by a network device through high layer signaling.

It should be appreciated that, the method is applied to the network device, and cooperates with the above-mentioned method for detecting the downlink control channel for UE to transmit and receive the downlink control channel. The implementation of the method may refer to that of the method for the UE mentioned hereinabove, with a same technical effect.

Figure 5:
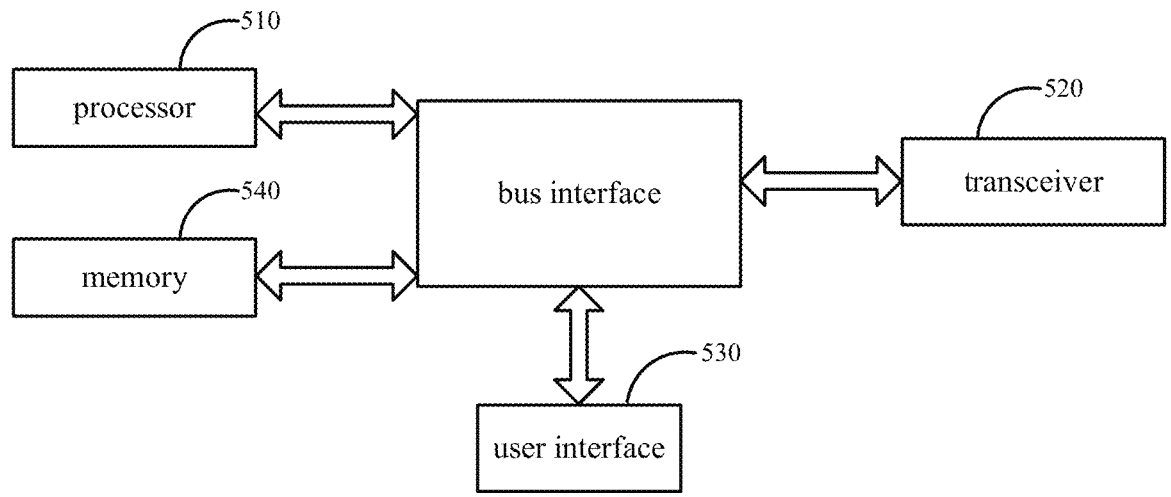
FIG. 5 is a schematic view showing a UE according to one embodiment of the present disclosure.

As shown in FIG. 5, the present disclosure provides in some embodiments a UE, which includes a transceiver 520, a memory 540, a processor 510, and a program stored in the memory 540 and executed by the processor 510. The processor 510 is configured to execute the program, so as to detect the downlink control channel within a current slot using a corresponding PDCCH resource pattern in accordance with whether there is an SSB within the current slot.

In some possible embodiments of the present disclosure, the processor 510 is further configured to detect the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the processor 510 is further configured to detect the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

In FIG. 5, bus architecture may include a number of buses and bridges connected to each other, so as to connect various circuits for one or more processors 510 and one or more memories 540. In addition, as is known in the art, the bus architecture may be used to connect any other circuits, such as a circuit for a peripheral device, a circuit for a voltage stabilizer and a power management circuit. A bus interface may be provided, and the transceiver 520 may consist of a plurality of elements, i.e., a transmitter and a receiver for communication with any other devices over a transmission medium. For example, the transceiver 520 receives external data from the other device, and transmits data processed by the processor 510 to the other device. Depending on properties of a computing system, a user interface 530, e.g., a keypad, a display, a speaker, a microphone or a joystick, may also be provided.

The processor 510 may take charge of managing a bus 500 as well as general processings. The memory 540 may store therein data for the operation of the processor 510.

In some possible embodiments of the present disclosure, the processor 510 may be a Central Processing Unit (CPU), an Application Specific Integrated Circuit (ASIC), a Field-Programmable Gate Array (FPGA) or a Complex Programmable Logic Device (CPLD).

Figure 6:
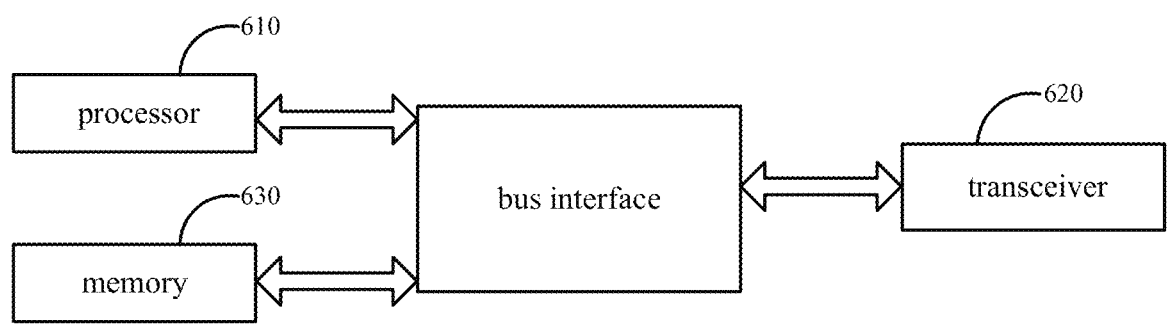
FIG. 6 is a schematic view showing a network device according to one embodiment of the present disclosure.

As shown in FIG. 6, the present disclosure provides in some embodiments a network device, which includes a transceiver 620, a memory 630, a processor 610, and a program stored in the memory 630 and executed by the processor 610. The processor 610 is configured to execute the program so as to transmit the downlink control channel within a current slot using a corresponding PDCCH resource pattern in accordance with whether there is an SSB within the current slot.

In some possible embodiments of the present disclosure, the transceiver 620 is configured to transmit the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the transceiver 620 is further configured to transmit the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

The transceiver 620 is configured to receive and transmit data under the control of the processor 610. In FIG. 6, bus architecture may include a number of buses and bridges connected to each other, so as to connect various circuits for one or more processors 610 and one or more memories 630. In addition, as is known in the art, the bus architecture may be used to connect any other circuits, such as a circuit for a peripheral device, a circuit for a voltage stabilizer and a power management circuit. A bus interface may be provided, and the transceiver 620 may consist of a plurality of elements, i.e., a transmitter and a receiver for communication with any other devices over a transmission medium. The processor 610 may take charge of managing the bus architecture as well as general processings. The memory 630 may store therein data for the operation of the processor 610.

The present disclosure further provides in some embodiments a device for detecting a downlink control channel for a UE, which includes a processing module configured to detect the downlink control channel within a current slot using a corresponding PDCCH resource pattern in accordance with whether there is an SSB within the current slot.

In some possible embodiments of the present disclosure, the processing module includes a first processing sub-module configured to detect the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the processing module includes a second processing sub-module configured to detect the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

According to the device in the embodiments of the present disclosure, the downlink control channel is detected within the current slot using an appropriate PDCCH resource pattern in accordance with whether there is the SSB within the current slot. As a result, it is able to prevent a decrease in a downlink control channel capacity, thereby to prevent the occurrence of such a circumstance where it is impossible to transmit the downlink control channel within the slot where the SSB is transmitted.

It should be appreciated that, the device is configured to implement the above-mentioned method for the UE, and the implementation of the device may refer to that of the method for the UE with a same technical effect.

The present disclosure further provides in some embodiments a device for transmitting a downlink control channel for a network device, which includes a transmission module configured to transmit the downlink control channel within a current slot using a corresponding PDCCH resource pattern in accordance with whether there is an SSB within the current slot.

In some possible embodiments of the present disclosure, the transmission module includes a first transmission sub-module configured to transmit the downlink control channel using a first PDCCH resource pattern within a slot where the SSB is transmitted. The first PDCCH resource pattern occupies consecutive N1 symbols in a time domain and B1 RBs in a frequency domain, and the N1 symbols do not overlap symbols for transmitting the SSB, where N1 is a positive integer greater than or equal to 1, and B1 is a positive integer greater than or equal to 1.

In some possible embodiments of the present disclosure, the first PDCCH resource pattern is pre-defined in a protocol or determined in accordance with a resource position of the SSB.

In some possible embodiments of the present disclosure, the transmission module includes a second transmission sub-module configured to transmit the downlink control channel using a second PDCCH resource pattern within a slot where no SSB is transmitted. The second PDCCH resource pattern occupies consecutive N2 symbols in a time domain and B2 RBs in a frequency domain, where N2 and B2 are each a positive integer greater than or equal to 1.

In some possible embodiments of the present disclosure, the second PDCCH resource pattern is configured by a network device through high layer signaling.

According to the device in the embodiments of the present disclosure, the downlink control channel is transmitted within the current slot using an appropriate PDCCH resource pattern in accordance with whether there is the SSB within the current slot. As a result, it is able to prevent a decrease in a downlink control channel capacity, thereby to prevent the occurrence of such a circumstance where it is impossible to transmit the downlink control channel within the slot where the SSB is transmitted.

It should be appreciated that, the device is configured to implement the above-mentioned method for the network device, and the implementation of the device may refer to that of the method for the network device with a same technical effect.

The present disclosure further provides in some embodiments a computer-readable storage medium storing therein a program. The program is executed by a processor so as to implement the steps in the above-mentioned method for detecting the downlink control channel for the UE, or the steps in the above-mentioned method for transmitting the downlink control channel.

The computer-readable storage medium may include volatile or nonvolatile, mobile or immobile storage medium capable of storing therein information using any method or technique. The information may be a computer-readable instruction, a data structure, a program or any other data. The computer-readable storage medium may include, but not limited to, a Random Access Memory (e.g., Phase Change Random Access Memory (PRAM), Static Random Access Memory (SRAM) or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

It should be further appreciated that, the UE described in the specification includes, but not limited to, smart phone or tablet computer. The functional members described in the specification are referred to as modules, so as to emphasize the independence of the implementation in a more particular manner.

In the embodiments of the present disclosure, the modules are implemented by software, so as to be executed by various processors. For example, an identified, executable code module includes one or more physical or logical blocks including computer instructions, and the module is constructed as an image, a process or a function. Even so, the executable codes of the identified modules are unnecessary to be physically located together, but include different instructions stored in different locations. When these instructions are logically combined together, they form the modules and achieve the prescribed purposes of the modules.

Actually, the executable code module is a single instruction or a plurality of instructions, and even it is distributed at different code segments, in different programs, or across a plurality of memory devices. Also, operational data is identified in the modules, implemented in any appropriate form, and organized in any data structure of an appropriate type. The operational data is collected as a single data set, or distributed at different locations (including different memory devices), and it is at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit includes a conventional very-large-scale integration (VLSI) circuit, a gate array, an existing semiconductor such as a logic chip and a transistor, or other discrete components. The modules are further implemented by a programmable hardware device, such as a field-programmable gate array, a programmable array logic device and a programmable logic device.

It should be appreciated that, the embodiments of the present disclosure are implemented by hardware, software, firmware, middleware, microcode or a combination thereof. For the hardware implementation, the processor includes one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

The above illustrative embodiments have been described with respect to the drawings, and the other embodiments are also feasible without departing from the spirit and teaching of the present disclosure, so the illustrative embodiments shall not be used to limit the scope of the present disclosure. More definitely, the illustrative embodiments are provided so as to make the present disclosure complete, and deliver the scope of the present disclosure to those skilled in the art. In the drawings, sizes and relative sizes of the members are scaled up for clarification. Terms involved in the present disclosure are merely used to describing the specific embodiments, but shall not be inclined to become a restricted use. Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. Unless otherwise defined, a numerical range includes an upper limit, a lower limit and any sub-range.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for detecting a downlink control channel performed by a User Equipment (UE), comprising:
   detecting the downlink control channel within a current slot using a corresponding Physical Downlink Control Channel (PDCCH) resource pattern among multiple different PDCCH resource patterns, in accordance with whether there is a Synchronization Signal Block (SSB) within the current slot,
   wherein each of the PDCCH resource patterns is suitable for determining resources used for detecting the PDCCH.

2. The method according to claim 1, wherein the detecting the downlink control channel within the current slot using the corresponding PDCCH resource pattern in accordance with whether there is the SSB within the current slot comprises:
   detecting the downlink control channel using a first PDCCH resource pattern within a slot where the SSB is transmitted,
   wherein the first PDCCH resource pattern is a PDCCH resource pattern suitable for detecting the downlink control channel within the slot where the SSB is transmitted, the first PDCCH resource pattern occupies consecutive N1 symbols in a time domain and B1 Resource Blocks (RBs) in a frequency domain, and the N1 symbols do not overlap symbols for transmitting the SSB, where N1 is a positive integer greater than or equal to 1, and B1 is a positive integer greater than or equal to 1.

3. The method according to claim 2, wherein the first PDCCH resource pattern is pre-defined or determined in accordance with a resource position of the SSB.

4. The method according to claim 2, wherein within the slot where the SSB is transmitted, physical resources used for transmitting the PDCCH occupies the current slot used for transmitting the SSB and one or more next slots used for transmitting the SSB.

5. The method according to claim 1, wherein the detecting the downlink control channel within the current slot using the corresponding PDCCH resource pattern in accordance with whether there is the SSB within the current slot comprises:
 detecting the downlink control channel using a second PDCCH resource pattern within a slot where no SSB is transmitted,
 wherein the second PDCCH resource pattern is a PDCCH resource pattern suitable for detecting the downlink control channel within the slot where no SSB is transmitted, the second PDCCH resource pattern occupies consecutive N2 symbols in a time domain and B2 RBs in a frequency domain, where N2 and B2 are each a positive integer greater than or equal to 1.

6. The method according to claim 5, wherein the second PDCCH resource pattern is configured by a network device through high layer signaling.

7. The method according to claim 1, wherein a quantity of symbols occupied in a time domain by the PDCCH resource pattern where there is an SSB within the current slot is less than a quantity of symbols occupied in a time domain by the PDCCH resource pattern where there is no SSB within the current slot; or
 a quantity of resource blocks occupied in a frequency domain by the PDCCH resource pattern where there is an SSB within the current slot is greater than or equal to a quantity of resource blocks occupied in a frequency domain by the PDCCH resource pattern where there is no SSB within the current slot.

8. A method for transmitting a downlink control channel performed by a network device, comprising:
 transmitting the downlink control channel within a current slot using a corresponding Physical Downlink Control Channel (PDCCH) resource pattern among multiple different PDCCH resource patterns, in accordance with whether there is a Synchronization Signal Block (SSB) within the current slot,
 wherein each of the PDCCH resource patterns is suitable for determining resources used for detecting the PDCCH.

9. The method according to claim 8, wherein the transmitting the downlink control channel within the current slot using the corresponding PDCCH resource pattern in accordance with whether there is the SSB within the current slot comprises:
 transmitting the downlink control channel using a first PDCCH resource pattern within a slot where the SSB is transmitted,
 wherein the first PDCCH resource pattern is a PDCCH resource pattern suitable for detecting the downlink control channel within the slot where the SSB is transmitted, the first PDCCH resource pattern occupies consecutive N1 symbols in a time domain and B1 Resource Blocks (RBs) in a frequency domain, and the N1 symbols do not overlap symbols for transmitting the SSB, where N1 is a positive integer greater than or equal to 1, and B1 is a positive integer greater than or equal to 1.

10. The method according to claim 9, wherein the first PDCCH resource pattern is pre-defined or determined in accordance with a resource position of the SSB.

11. The method according to claim 9, wherein within the slot where the SSB is transmitted, physical resources used for transmitting the PDCCH occupies the current slot used for transmitting the SSB and one or more next slots used for transmitting the SSB.

12. The method according to claim 8, wherein the transmitting the downlink control channel within the current slot using the corresponding PDCCH resource pattern in accordance with whether there is the SSB within the current slot comprises:
 transmitting the downlink control channel using a second PDCCH resource pattern within a slot where no SSB is transmitted,
 wherein the second PDCCH resource pattern is a PDCCH resource pattern suitable for detecting the downlink control channel within the slot where no SSB is transmitted, the second PDCCH resource pattern occupies consecutive N2 symbols in a time domain and B2 RBs in a frequency domain, where N2 and B2 are each a positive integer greater than or equal to 1.

13. The method according to claim 12, wherein the second PDCCH resource pattern is configured by a network device through high layer signaling.

14. The method according to claim 8, wherein a quantity of symbols occupied in a time domain by the PDCCH resource pattern where there is an SSB within the current slot is less than a quantity of symbols occupied in a time domain by the PDCCH resource pattern where there is no SSB within the current slot; or
 a quantity of resource blocks occupied in a frequency domain by the PDCCH resource pattern where there is an SSB within the current slot is greater than or equal to a quantity of resource blocks occupied in a frequency domain by the PDCCH resource pattern where there is no SSB within the current slot.

15. A User Equipment (UE), comprising a transceiver, a memory, a processor, and a program stored in the memory and executed by the processor, wherein the processor is configured to execute the program, so as to detect the downlink control channel within a current slot using a corresponding Physical Downlink Control Channel (PDCCH) resource pattern among multiple different PDCCH resource patterns, in accordance with whether there is a Synchronization Signal Block (SSB) within the current slot,
 wherein each of the PDCCH resource patterns is suitable for determining resources used for detecting the PDCCH.

16. The UE according to claim 15, wherein the processor is further configured to detect the downlink control channel using a first PDCCH resource pattern within a slot where the SSB is transmitted,
 wherein the first PDCCH resource pattern is a PDCCH resource pattern suitable for detecting the downlink control channel within the slot where the SSB is transmitted, the first PDCCH resource pattern occupies consecutive N1 symbols in a time domain and B1 Resource Blocks (RBs) in a frequency domain, and the N1 symbols do not overlap symbols for transmitting the SSB, where N1 is a positive integer greater than or equal to 1, and B1 is a positive integer greater than or equal to 1.

17. The UE according to claim 16, wherein the first PDCCH resource pattern is pre-defined or determined in accordance with a resource position of the SSB.

18. The UE according to claim 15, wherein the processor is further configured to detect the downlink control channel using a second PDCCH resource pattern within a slot where no SSB is transmitted,
- wherein the second PDCCH resource pattern is a PDCCH resource pattern suitable for detecting the downlink control channel within the slot where no SSB is transmitted, the second PDCCH resource pattern occupies consecutive N2 symbols in a time domain and B2 RBs in a frequency domain, where N2 and B2 are each a positive integer greater than or equal to 1.

19. The UE according to claim 18, wherein the second PDCCH resource pattern is configured by a network device through high layer signaling.

20. The UE according to claim 15, wherein a quantity of symbols occupied in a time domain by the PDCCH resource pattern where there is an SSB within the current slot is less than a quantity of symbols occupied in a time domain by the PDCCH resource pattern where there is no SSB within the current slot; or
- a quantity of resource blocks occupied in a frequency domain by the PDCCH resource pattern where there is an SSB within the current slot is greater than or equal to a quantity of resource blocks occupied in a frequency domain by the PDCCH resource pattern where there is no SSB within the current slot.

* * * * *